Figure 3:
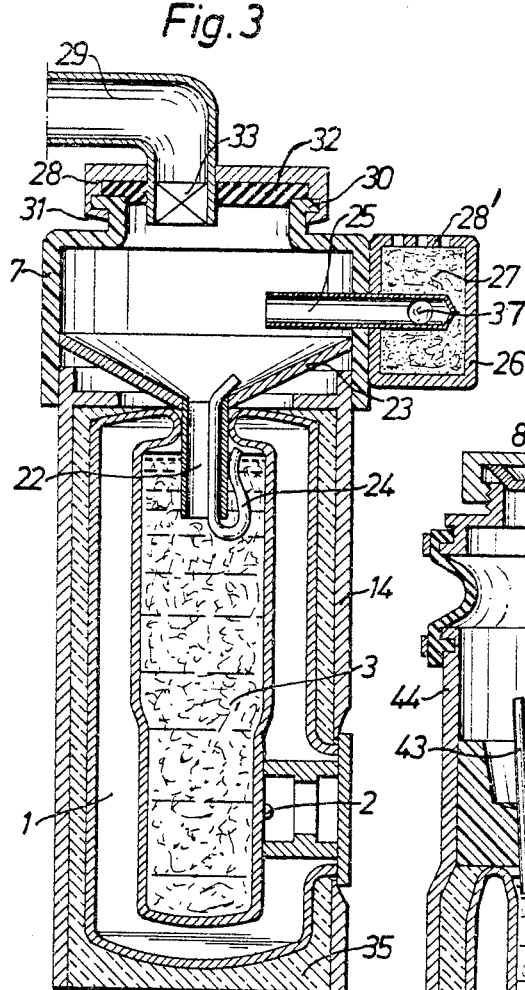

United States Patent [19]

Rudolphi et al.

[11] 4,259,846
[45] Apr. 7, 1981

[54] VESSEL FOR STORING CRYOGENIC LIQUIDS

[75] Inventors: Kjell Rudolphi, Ektorp; Ingvar Johansson, Täby, both of Sweden

[73] Assignee: AGA Aktiebolag, Lidingo, Sweden

[21] Appl. No.: 39,143

[22] Filed: May 15, 1979

[30] Foreign Application Priority Data

Jun. 8, 1978 [SE] Sweden ................................ 7806688

[51] Int. Cl.³ ............................................... F17C 7/02
[52] U.S. Cl. ....................................... 62/48; 62/514 R; 220/85 VS; 431/344
[58] Field of Search ..................... 62/48, 45, 514 R; 220/85 VS; 431/344

[56] References Cited

U.S. PATENT DOCUMENTS

| 2,195,077 | 3/1940 | Brown | 62/48 |
| 2,504,314 | 4/1950 | Feick | 62/48 |
| 3,377,813 | 4/1968 | Mordhorst | 62/45 |

*Primary Examiner*—Ronald C. Capossela
*Attorney, Agent, or Firm*—Larson, Taylor and Hinds

[57] ABSTRACT

An arrangement for storing cryogenic liquid comprises a Dewar-flask-like vessel. The vessel is filled completely with a material able to absorb a cryogenic substance when said substance is in liquid form but only capable of absorbing said substance to a limited extent when said substance is in gas form. Adjacent to the mouth of said vessel and externally thereof there is provided a cavity, which is arranged to cooperate with means by which any gases formed in said cavity can be released to atmosphere when the pressure in said cavity exceeds a given pressure.

7 Claims, 4 Drawing Figures

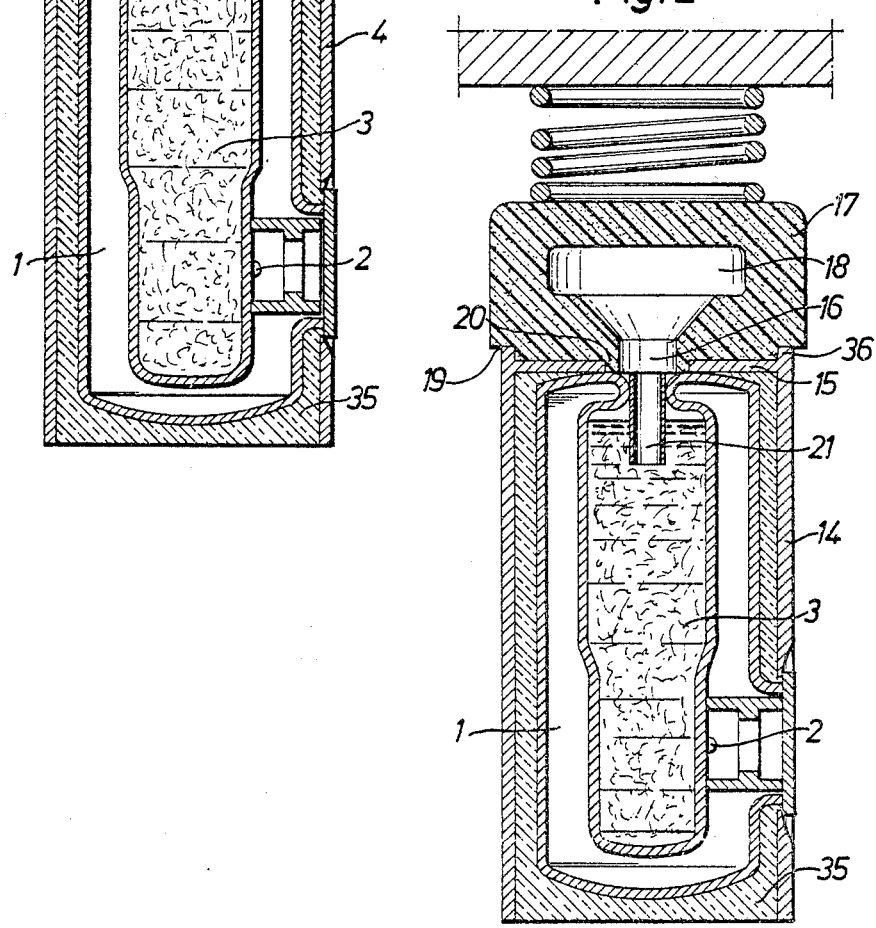

U.S. Patent   Apr. 7, 1981   Sheet 2 of 2   4,259,846

VESSEL FOR STORING CRYOGENIC LIQUIDS

The present invention relates to apparatus for storing a cryogenic liquid at a pressure beneath atmospheric pressure, in which apparatus said liquid is contained in a Dewar-flask.

In the case of apparatus whose function depend upon cryogenic cooling, and in particular in the case of such apparatus which can readily be carried, such as an IR-camera, it has been previously necessary to handle such apparatus with great care. For example, such apparatus cannot be held in just any position or attitude. For example, they cannot be tilted or held upside down, and neither can they be moved so abruptly as to cause the liquid contained in the flask to "slosh", since this would result in a loss of nitrogen, owing to the fact that the addition of energy will increase the extent to which the liquid vaporizes. For certain reasons, the flask or vessel in which the cryogenic liquid is stored may not be completely sealed. Consequently, it is quite impossible to prevent the ambient temperature from having an effect on the cryogenic liquid, and hence the liquid vaporizes continuously, to a relatively high degree. If the flask or vessel were to be completely sealed off, the pressure inside the flask would rapidly increase to a level above ambient pressure—something which must be prevented. Because the flask or vessel cannot be completely sealed, it is not only vaporized liquid which escapes when the vessel is tilted too much, but also the liquid itself. Naturally, this results in a loss of liquid, which perhaps can in many cases be tolerated per se. This liquid, however, presents a hazard to the person handling the apparatus, since any skin-contact with the escaping liquid may result in personal injury such as frostbite. Even should the apparatus be so well designed that no liquid escaping from the flask is able to reach the person handling said flask, the sound which ensues as the liquid decocts, when it comes into contact with an object at room temperature, is extremely unpleasant to said person.

These disadvantages have been of a serious nature for a long period of time; so serious in fact that it has not been possible to utilize such apparatus in the manner desired, because it has been necessary to cool with a cryogenic liquid.

A primary object of the invention is to provide an apparatus which does not have the disadvantages of the aforedescribed known apparatus.

Accordingly, this invention consists in an apparatus in which said liquid is contained in a Dewar-flask, completely filled with a material capable of absorbing a cryogenic substance when said substance is in liquid form but not to any substantional extent when said substance is in gas form, said material being, for example, cotton wool, aloxide or Kadwool ®. A cavity is provided externally of and in communication with the mouth of the Dewar-flask, said cavity having means cooperating therewith for ventilating said cavity to the surroundings when the pressure in said cavity exceeds the ambient pressure.

The invention will now be described in more detail with reference to four exemplary embodiments thereof, each illustrated respectively in the central cross-sectional views of FIGS. 1,2,3 and 4 of the accompanying drawings.

In FIG. 1 there is illustrated a first embodiment of the apparatus according to the invention. A Dewar-flask, which by definition is a flask with double walls 1 having an evacuated space therebetween and made of some suitable material, such as glass, plastics or metal, has in its inner side wall an IR-detector 2 which is surrounded by an annular shield. Since the construction of the Dewar-flask and the positioning of the IR-detector do not form any part of the invention and are well known to one of normal skill in the art, no further description will be given in respect thereof. When the flask 1 is filled with cryogenic liquid, the IR-detector 2 is effectively cooled. In accordance with the invention, the Dewar-flask is filled with a liquid-absorbing material capable of binding cryogenic liquid. Of the various materials tested, cotton wool has been found extremely effective, although other materials, such as aloxide-wool, Kadwool ®, and like materials have been found to give satisfactory results.

The Dewar-flask 1 is placed in a sleeve 4 having a recess or aperture opposite the detector 2 and having a width or cross extension which is much greater than that required to accommodate the flask 1, thereby to present a space between the respective walls of the flask 1 and the sleeve 4. Cast in this interspace is a mass 35 which serves to hold the flask in the sleeve and forms a heat-insulating layer. The sleeve 4 is provided at its upper end with a funnel-shaped element 5, whose outer end is angled downwardly and is attached to the sleeve 4. The funnel-like element 5 slopes down towards the opening of the flask 1 and the inner diameter of said element is substantially equal to the diameter of the mouth of said flask. The element 5 is preferably made of an electrically conductive material or is provided with an electrically conductive layer, and serves to shield the IR-detector 2 itself from electrostatic disturbances. Sealingly mounted on the upper end of the sleeve 4 is a splash-housing 7 which is made of a heat-insulating material. In the embodiment illustrated in FIG. 1, the splash-housing 7 has the form of the upper part of a flask with screw threads around the outer part of the neck of said flask. Screwed onto the neck is a lid 8. The lid has on the part thereof facing the interior of the splash-housing 7 a seal 9 which is made of a resilient material. When filling the flask 1, the lid 8 is unscrewed and the flask filled through the thus exposed opening of the splash-housing 7. The liquid is conducted down into the flask 1 by the funnel-shaped element 5.

Arranged in the wall of the splash-housing 7 is a tube 10, which projects into the housing to approximately the centre thereof and which has a chamfered end, with the chamfered edge facing the mouth of the flask 1, as illustrated. The other end of the tube 10 discharges into a vessel 11 having walls of a heat-conductive material and being filled with a material 12 which will absorb a cryogenic substance when in liquid form but not to any great extent when said substance is in vapour form. Cotton wool has been found to be a suitable material for this purpose. The vessel 11 is provided with a lid 13 which is resiliently held against the vessel.

Preferably, the material of that part of the shield facing the interior of the splash-housing 7 is also heat-insulating. When the shield is formed completely from one and the same material, this material is preferably both electrically conductive and heat-insulating. Conviently, the sleeve 4 is made of an electrically conductive material. It will be understood that the provision of an electrostatic shield is only necessary when a Dewar-flask is to be used in cooperation with an IR-detector. The apparatus according to the invention can very well be used in other contexts, and consequently the invention is in no way limited to the provision of such a shield.

The apparatus illustrated in FIG. 1 has the following mode of operation. Should the apparatus be tilted or turned upside down, such that liquid in the flask runs into the splash-housing 7, some of the liquid will be gasified. Since the walls of the housing 7 are thermally insulated, however, the greater part of the liquid will remain in liquid form.

All the time that a cryogenic liquid is present in the flask 1, vaporization of the liquid will take place. The resultant gas must be evacuated in one way or another, since otherwise the pressure in the flask will build up. This evacuation of the gas is effected through the tube 10 and the vessel 11, in which the spring force acting on the lid 13 is such that when the pressure created in the splash-housing 7 by the vaporization of said liquid exceeds a given value, the lid is lifted slightly to permit the gas to escape. Since it is also possible that some of the liquid may tend to escape through the tube 10, the vessel 11 is provided with the said cryogenic-substance absorbing material 12, which retains the liquid until it has vaporized.

As will be understood, any liquid present in the splash-housing 7 will run back into the flask 1 as soon as the apparatus according to the invention has been returned to an upright position. The tube 10 has been chamfered in the manner illustrated, in order to prevent liquid being forced out through the tube 10 during a filling operation.

FIG. 2 illustrates a second embodiment of the arrangement according to the invention. A Dewar-flask 1 is also inserted in a sleeve 14 in this embodiment.

In its upper part, the sleeve 14 is provided with a ring-shaped, flat part 15 which has a straight portion projecting inwardly of the sleeve and formed integrally therewith. The sleeve extends a short distance, reference 36, over the ring-shaped part 15. The diameter of the opening defined by the ring-shaped part 15 is much larger than the opening diameter of the flask 1. The sleeve 14 and the part 15 are made of an electrically conductive material, the part 15 in particular forming an electrostatic shield.

Mounted directly on the upper part of the sleeve above the opening of the Dewar-flask is a lid. The lid is made of a strongly heat-insulating, solid material, such as frigolite or like material, and has thick walls and exhibits a relatively large splash-space 18 above the flask 1. The end surface of the lid facing the sleeve 14 conforms with the shape of the end of the sleeve receiving said lid. Thus the lid has arranged peripherally therein a ring-shaped recess 19 in which the part 36 of the sleeve 14 projecting above the part 15 rests. In addition, there is provided a downwardly projecting ring-shaped part 20 whose outer diameter substantially coincides with the inner diameter of the ring-shaped part 15, the inner diameter of said part 15 being slightly greater than the diameter of the opening of the Dewar-flask, and the depth of said part 20 substantially coinciding with the thickness of said part 15, whereby a good heat-seal is obtained. The lid 17 is held firmly on the Dewar-flask by means of a spring, whereby gas formed in the space 18 is allowed to stream out to prevent the pressure in said space exceeding the ambient pressure. Because the lid is held against the flask by means of said spring in the illustrated manner, air saturated with moisture is unable to enter the flask, since it is only when there is an overpressure in the flask that the lid is released. It is important that the interior of the flask is kept free of water to the greatest extent possible, since the cryogenic absorbing-material 3 will also readily bind water. Although in the illustrated embodiment, the lid is held against the flask by means of a spring, it will readily be understood that any form of spring means may be used to the end described.

Mounted in the opening of the flask 21 is a tube 1 having extremely thin walls, said tube being mounted and fixed by means of an adhesive for example. The tube 21 extends somewhat into the flask 1 and its purpose is to reduce the amount of liquid which would flow from the flask 1 should it be turned upside down, than if the tube were not provided. If the tube were not provided, the walls of the flask adjacent the opening thereof would function as a funnel. With the tube 21 inserted, however, liquid which is not completely absorbed by the material 3 collects around the tube and only a very minor part of the liquid will run out.

FIG. 3 illustrates a third embodiment of the arrangement according to the invention. The elements 1,2,3,7,14 of the FIG. 3 embodiment coincide with those of the FIG. 1 embodiment. Inserted in the opening of the flask is a tube 22 which is provided at its upper end with a funnel-shaped plate 23 made of a heat-insulating material, the outer diameter of the plate 23 coinciding with the inner diameter of the splash-housing 7, said plate 23 being sealingly mounted on said housing. The plate 23 provides a heat-insulating element in the housing 7. If an electrostatic shield is required to protect an IR-detector, the outer part of the splash-housing 7 can conveniently be provided with a layer of electrically conductive material. The tube 22 extends a relatively long distance into the flask 1. Arranged in the tube 22 is an exhaust pipe 24 which discharges into the splash-housing 7 and which at the end thereof located in the flask is curved around the edge of the tube 22 and extends up to the uppermost part of the flask. When filling the flask through the upper part of the splash-housing 7, liquid runs through the tube 22 into the Dewar-flask 1 via the splash-housing 7. When no such pipe 24 is provided, a pocket of gas is liable to form the upper part of the flask, preventing the flask from being completely filled. The pipe 24 permits this gas to escape.

In the FIG. 3 embodiment, the lid 28, which is snapped over a flange-like part of the neck of the splash-housing 7, has arranged therein a tube 29. The said neck is provided with an outwardly projecting flange 30 and the cup-shaped lid is made of a resilient material and is provided around the bottom edge thereof with an inwardly extending flange 31. The tube 29 also seats in a ring-shaped cushion 32 of a soft resilient material, such as rubber, arranged on the bottom of the lid 28. Arranged in the part of the tube 29 facing the splash-space in the splash-housing 7 is a valve 33, which may optionally be controlled electrically. The flask 1 can be filled through the tube 29 from a location of the instrument containing the arrangement according to the invention, said location being one which is more suitable than the lid 128 for filling purposes. In certain cases, it is also conceivable to couple the tube 29 for automatic filling of the vessel from a container located externally of said vessel, upon receipt of a signal transmitted by a liquid-indicator arranged in said flask, or for the filling of said flask at uniform time intervals when the instrument is to be arranged to register automatically a heat sequence or the like over a long period of time.

Similar to the embodiment of FIG. 1, the FIG. 3 embodiment is also provided with a pipe 25 arranged in the wall of the splash-housing 7 for evacuating air therefrom, although in this embodiment the inner end of the pipe does not project into the center of the splash-housing. The pipe 25 has a squarely cut end. The other end of the pipe discharges into a closed container 26 mounted on the outer wall of the housing 7 and filled with a liquid-absorbing material 27. The container 26 has a perforated upper wall 28', through which gas can pass. The pipe 25 is closed at the end located adjacent the wall of the container 26 remote from the splash-housing 7 and has, instead, an opening 36 in its side wall approximately centrally of the container. As with the FIG. 1 embodiment, the purpose of the container 26 is to ensure positive vaporization without any cryogenic liquid running out, this being effected by the fact that the material 27 absorbs any liquid from the splash-housing through the tube 25 and is gasified before it can pass through the perforated wall 28'.

Figure 4:
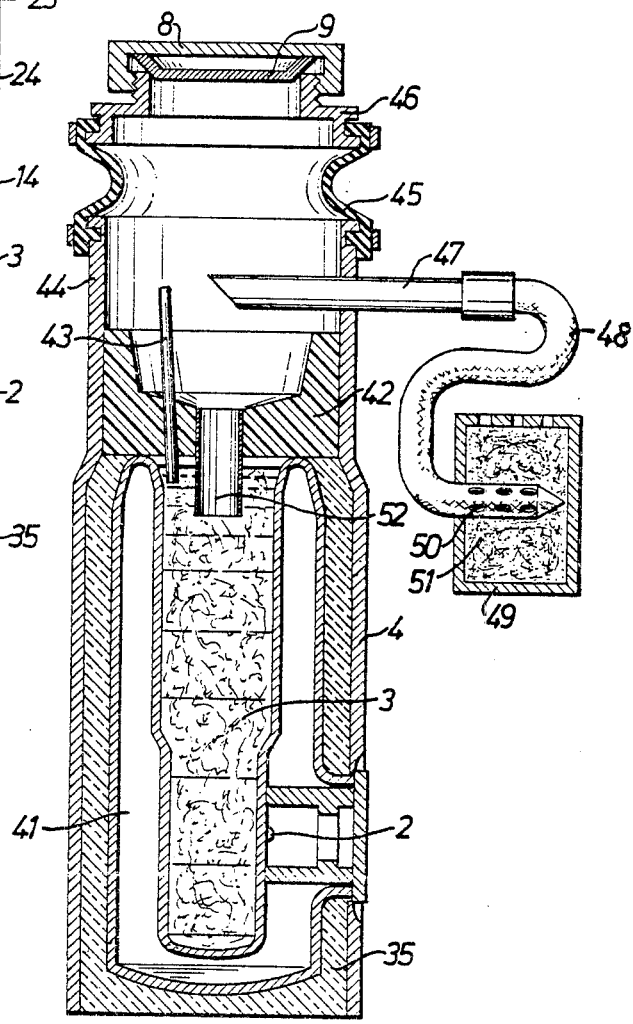

FIG. 4 illustrates a further embodiment of the apparatus according to the invention. This apparatus includes a Dewar-flask 41 having straight edges and filled with a material 3 which absorbs liquid nitrogen, e.g. cotton wool. Sealingly mounted on the mouth of the flask in the sleeve 4 is a ring-shaped insulating element 42, whose outer peripheral portion sealingly abuts the wall of the sleeve 4. The element 42 has a flat bottom surface and at the top thereof has the form of a funnel such that cryogenic liquid poured into the arrangement is conducted down into the Dewar-flask 41 through a thin-walled tube 52 arranged in the center opening of the element 42, said tube 52 extending somewhat into the flask 1. An evacuation pipe 43 is mounted in the element 42 to further facilitate filling of the flask 41. The pipe 43 discharges into the upper part of the Dewar-flask adjacent its side walls and extends a considerable distance into the splash-housing 44. The upper end of the pipe 43 discharges into the splash-housing at such a high level therein as to obviate any risk of said end being covered by liquid during a filling operation. The housing 44, at least in the area thereof adjacent the splash cavity, is made of a heat-conductive material to facilitate vaporization of any liquid entering the splash-housing whilst the apparatus incorporating the invention is in use.

In order to illustrate that the walls of the splash-housing need not comprise a rigid material, part of the wall in the upper portion of the splash-housing is shown to comprise a flexible rubber hose 45 which is sealingly attached to the rigid sleeve 44 and to the upper part 46 of the splash-housing, said upper part carrying the lid 8,9. Such an arrangement may be suitable, for example, when the lid and the sleeve are to be attached to elements which are movable relative to one another.

As with the tube 10 in the FIG. 1 embodiment, the tube 47 is mounted on the wall of the splash-housing and discharges centrally thereof, said tube 47 being coupled, via a hose 48 of flexible material, such as rubber, to a tube 50 which extends into a container 49 filled with a material 51 which will absorb nitrogen in liquid form, but not in gas form, such as cotton wool. The tube 51 extends through the whole of the container and is perforated on that part thereof located inside said container. The upper side of the container 51 is also perforated, to permit gasified nitrogen to pass out through the surrounding atmosphere.

Although the invention has been described with reference to exemplary embodiments thereof, it is not limited thereto but can be modified within the scope of the accompanying claims.

We claim:

1. An apparatus for storing cryogenic liquid at a pressure approximately equal to the ambient pressure, comprising a Dewar-flask for containing said liquid, said Dewar-flask being filled with a material capable of absorbing a cryogenic liquid, a cavity externally of and in communication with the mouth of the Dewar-flask, and including a vessel arranged in open communication with the cavity, said vessel being filled with a material capable of absorbing a cryogenic substance when said substance is in liquid form but not to any substantial extent when said substance is in gas form, and said vessel being ventilatable to the surroundings.

2. An apparatus as claimed in claim 1, wherein the vessel is connected to the cavity by means of an evacuation tube projecting into said cavity to a given distance from the cavity-defining wall so that one end of said tube is out of contact with said wall.

3. An apparatus as claimed in claim 2, wherein said one end of said evacuation tube terminates approximately centrally of the cavity, said one end being chamfered with the long edge of said chamfer facing downwardly into the Dewar-flask.

4. An apparatus as claimed in any one of claims 1, 2 or 3, wherein a filling tube made of a poor heat-conductive material is inserted in the opening of the Dewar-flask and extends somewhat thereinto.

5. An apparatus as claimed in claim 4, wherein an evacuation pipe for evacuating gas from the Dewar-flask has one end near the mouth of the Dewar-flask at the outside of said filling tube and the other end placed in the cavity.

6. An apparatus as claimed in claim 4, wherein the filling tube is provided at the part thereof facing said cavity with a funnel-shaped element of a poorly heat-conducting material, said element forming a wall of said cavity.

7. An apparatus as claimed in claim 6, wherein an evacuation pipe for evacuating gas from the Dewar-flask has one end near the mouth of the Dewar-flask at the outside of said filling tube and the other end placed in the cavity.

* * * * *